UNITED STATES PATENT OFFICE.

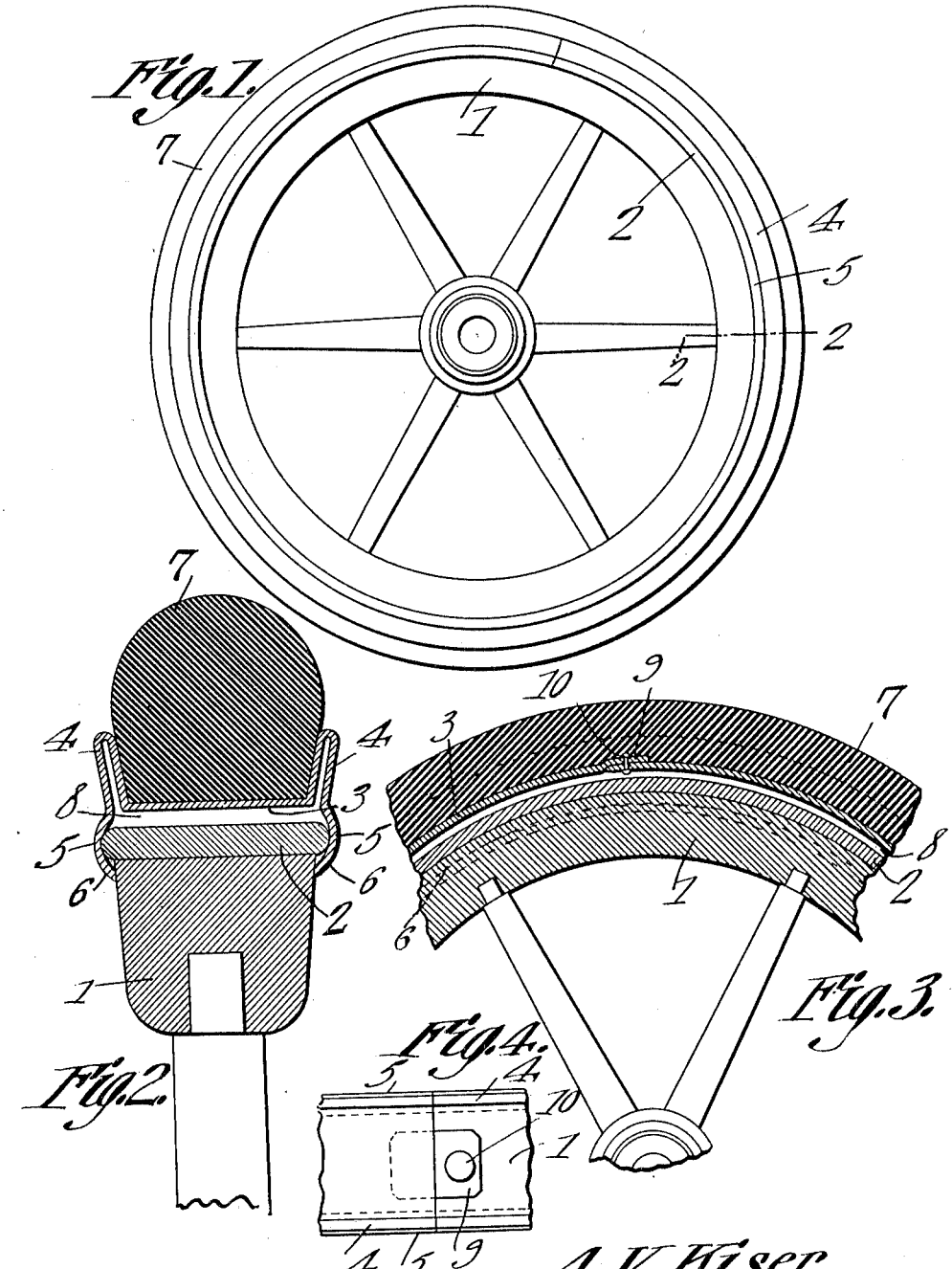

ALVIE V. KISER, OF TROY, OHIO.

TIRE.

1,118,496.  Specification of Letters Patent.  Patented Nov. 24, 1914.

Application filed May 13, 1913. Serial No. 767,398.

*To all whom it may concern:*

Be it known that I, ALVIE V. KISER, a citizen of the United States, residing at Troy, in the county of Miami and State of Ohio, have invented a new and useful Tire, of which the following is a specification.

The device forming the subject matter of this application is a tire which is adapted to be assembled readily with a wheel having a metal strap felly band of ordinary construction.

One object of the present invention is to provide a rim which may be connected with an unyielding strap felly band and with a solid auxiliary tire to the end that the solid auxiliary tire may be yieldably supported without the use of any springs other than laterally resilient flanges upon the rim, the flanges having concaved sockets which engage the edges of the strap felly band slidably so that when the rim moves radially of the strap felly band, a component may be resolved out of the gripping effect of the flanges, which component will tend to support the rim yieldably against radial movement.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing: Figure 1 shows in side elevation, a wheel equipped with the device constituting the subject matter of the present application; Fig. 2 is a transverse section on the line 2—2 of Fig. 1; Fig. 3 is a fragmental longitudinal section of a wheel to which the present invention has been applied; and Fig. 4 is a top plan showing the connected ends of the auxiliary rim.

In the drawings, the numeral 1 indicates the felly of a wheel, the same being provided with a strap felly band 2 of ordinary construction, outstanding along its edges beyond the felly 1.

The numeral 3 indicates an auxiliary rim, preferably fashioned from resilient metal and bent upon itself along its longitudinal edges, to form double-walled flanges 4, the flanges along their edges, being provided with sockets 5 which receive the edges of the strap felly band 2. The sockets 5 terminate in inwardly extended retaining grips 6 which engage beneath the strap felly band 2. By the construction above outlined, a space 8 exists between the auxiliary rim 3 and the felly band 2.

An auxiliary tire of any desired sort, indicated at 7 and ordinarily a solid rubber one, rests upon the auxiliary rim 3 and is supported against lateral movement by the flanges 4. In order to connect the ends of the rim 3, any suitable means may be provided. In the present instance, a tongue 9 outstands from one end of the rim and overlaps the other end of the rim, the tongue 9 and said other end of the rim being connected by means of a rivet 10 or the like. Although the double-walled flange indicated at 4 is desirable, it is understood that the flanges 4 may be fashioned in any suitable manner, provided that appropriate means is constructed for engaging the edges of the strap felly band 2.

The device herein disclosed may be assembled readily with the strap felly band of the sort indicated at 2, and through the medium of the device disclosed, a vehicle wheel of common and ordinary construction may be quickly transformed into a pneumatic structure in which, however, all danger of puncture is avoided. The sockets 5 are laterally resilient and grip the edges of the strap felly band 2. The sockets 5, however, are wider than the thickness of the strap felly band 2 measured radially of the wheel. Therefore, the sockets 5 may slide upon the edges of the strap felly band 2 radially of the wheel. Owing to the concaved form of the sockets 5, when the latter are moved apart as auxiliary tire 7 moves inwardly, a component is resolved out of the gripping resiliency of the sockets 5, which component acts radially of the wheel and aids in supporting the auxiliary tire 7 yieldingly.

Having thus described the invention, what is claimed is:—

In a device of the class described, a rigid felly; a rigid strap felly band upon the felly and projecting at its edges beyond the felly; a rim provided along its sides with inwardly projecting flanges having concaved seats which receive the projecting edges of the strap felly band, the flanges being laterally resilient to cause the same to grip the edges of the strap felly band, the seats being wider than the thickness of the strap felly band, measured radially of the felly, whereby the flanges may have a radial play upon the strap and resolve out of the gripping resiliency of the flanges, a radial component as the concaved seats move upon the edges of the strap felly band; and an auxiliary tire assembled with the rim.

In testimony that I claim the foregoing as my own, I have hereto affixed my signature in the presence of two witnesses.

ALVIE V. KISER.

Witnesses:
T. M. CAMPBELL,
W. H. McCLURE.